(No Model.)
J. J. FAULKNER.
COTTON SEED LINTING MACHINE.
No. 462,635. Patented Nov. 3, 1891.
FIG.I.
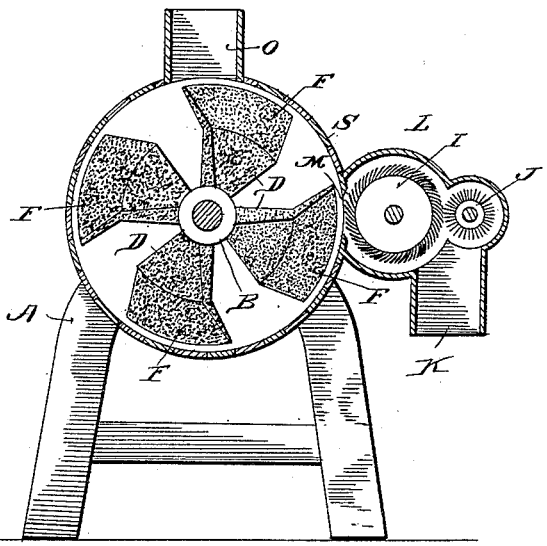
FIG.II.
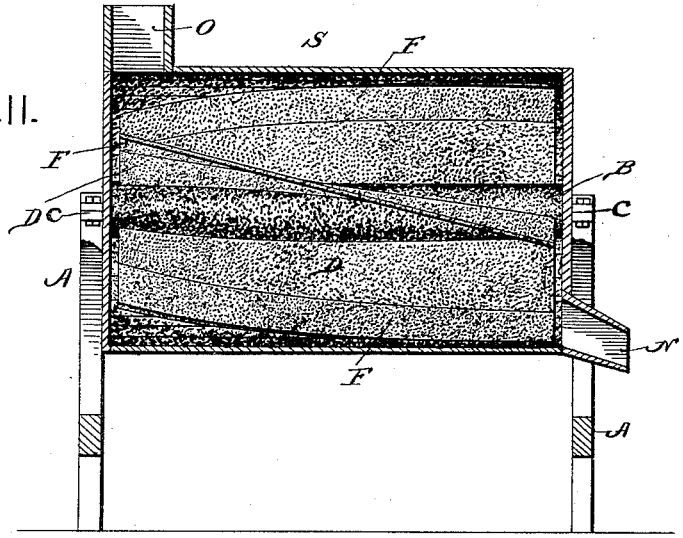
FIG.III.
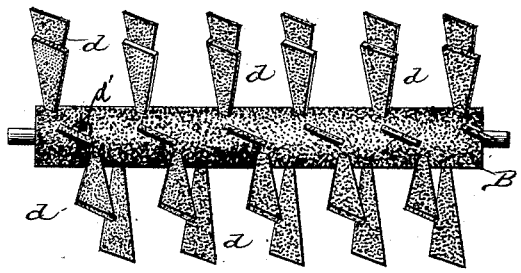
Attest:
Harry T. Rohrer
S. Catton
Inventor:
James J. Faulkner:
By Knight Bros.
Attorneys

UNITED STATES PATENT OFFICE.

JAMES J. FAULKNER, OF MEMPHIS, TENNESSEE, ASSIGNOR OF TWO-THIRDS TO THE NATIONAL COTTON SEED OIL AND HULLER COMPANY, OF SAME PLACE.

COTTON-SEED-LINTING MACHINE.

SPECIFICATION forming part of Letters Patent No. 462,635, dated November 3, 1891.

Application filed January 20, 1891. Serial No. 378,453. (No model.)

*To all whom it may concern:*

Be it known that I, JAMES J. FAULKNER, a citizen of the United States, residing at Memphis, in the county of Shelby and State of Tennessee, have invented certain new and useful Improvements in Cotton-Seed-Linting Machines, of which the following is a specification.

The object of my invention is to produce a machine of simple construction by which the lint or short fiber adhering to cotton-seed after passing through the gin may be effectually removed and separated from the seed.

My machine is constructed with a cylindrical casing made up with staves coated on the inside with emery, concrete, or like rough substance, and a cylinder revolving within it, from which extend radially paddles or wings, which are also arranged spirally and provided with rearwardly-inclined upper portions to the interior surface of the casing, the paddles or wings being also covered with emery or other material to produce a rough surface to act on the seed and lint by abrasion. I also provide a separating-cylinder provided with card-clothing or emery to take the detached lint out of the main cylinder and a doffing-brush to remove the lint from the separating-cylinder and discharge it from a suitable spout, as hereinafter fully described in connection with the accompanying drawings, in which—

Figure I is an end view of the machine with the end of the casing removed. Fig. II is a vertical longitudinal section of the same, the agitator being shown in elevation. Fig. III is a detail view illustrating another form of conveyer.

A represents a suitable frame, within which is mounted a cylinder B in journal boxes or bearings C. The cylinder B is here shown round; but instead any polygonal form of shaft may be employed.

S is a cylindrical casing surrounding the cylinder, preferably made up of staves, as shown, and coated on its inside surface with emery, concrete, or other suitable material, to scour the seed and detach the lint therefrom. The paddles or wings D are arranged radially and spirally, are provided with rearwardly-inclined edges F, and their whole surface is also coated with emery, or in any other suitable manner made rough for the purpose of scouring. The manner of securing these paddles or wings to the cylinder by screws $d'$, setting them in grooves, permits their ready removal for recoating with emery as often as needful.

O represents the feed-spout of the machine, and N the discharge-spout for the linted seed. The lint, as it is detached from the seed and carried around the casing by the rotation of the paddles or wings D, is caught up by a revolving cylinder I, covered with card-clothing or emery, working within a casing L on one side of the main casing S, with which it communicates through a longitudinal opening M. The portions F are so arranged or extended with relation to this opening M that they will project upward as they come opposite to the said opening, thus crowding the air and detached lint through such opening within reach of the cylinder I. The rotation of the paddles D produces a current of air which carries the detached lint through the opening M, where it is caught by the card-cylinder I, and from which it is discharged by the doffing-brush J, which is revolved in the opposite direction and at a higher surface velocity than the card-cylinder I, in customary manner, and delivers the lint into a spout or chute K.

In Fig. III the spirally-arranged radial wings D are divided into a number of dovetail sections $d$. The entire surface of the dovetail projections is covered with emery, the object of thus forming them being to offer increased attrition to the material in the casing.

The machine can be made of any length desired, and the cylinder and lint-collecting means extend the entire length.

Having thus described my invention, the following is what I claim as new therein and desire to secure by Letters Patent:

The combination of the cylinder having the spirally-arranged radial paddles or wings with rearwardly-inclined upper portions, the cylindrical casing, the gathering-cylinder H, and doffer J, said casing and paddles or wings being coated with a grinding-surface, substantially as and for the purposes set forth.

JAMES J. FAULKNER.

Witnesses:
F. P. POSTON,
JNO. J. MURPHY.